(12) United States Patent
Liao et al.

(10) Patent No.: US 11,987,676 B2
(45) Date of Patent: *May 21, 2024

(54) BLACK POLYESTER FILM AND METHOD FOR MANUFACTURING THE SAME

(71) Applicant: NAN YA PLASTICS CORPORATION, Taipei (TW)

(72) Inventors: Te-Chao Liao, Taipei (TW);
Wen-Cheng Yang, Taipei (TW);
Chun-Cheng Yang, Taipei (TW);
Chia-Yen Hsiao, Taipei (TW);
Ching-Yao Yuan, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 447 days.

This patent is subject to a terminal disclaimer.

(21) Appl. No.: 17/197,402

(22) Filed: Mar. 10, 2021

(65) Prior Publication Data
US 2021/0332200 A1 Oct. 28, 2021

(30) Foreign Application Priority Data

Apr. 28, 2020 (TW) .................... 109114092

(51) Int. Cl.
*C08J 5/18* (2006.01)
*B29C 48/00* (2019.01)
(Continued)

(52) U.S. Cl.
CPC .............. *C08J 5/18* (2013.01); *B29C 48/022* (2019.02); *C08G 63/183* (2013.01); *C08J 3/12* (2013.01);
(Continued)

(58) Field of Classification Search
None
See application file for complete search history.

(56) References Cited

U.S. PATENT DOCUMENTS 11,572,449 B2 * 2/2023 Liao ............... B29C 48/022
11,608,422 B2 * 3/2023 Liao ............... C08J 11/04
(Continued)

FOREIGN PATENT DOCUMENTS

CN 101657315 A 2/2010
CN 104086957 A 10/2014
(Continued)

*Primary Examiner* — Vivian Chen
(74) *Attorney, Agent, or Firm* — Li & Cai Intellectual Property (USA) Office

(57) ABSTRACT

A black polyester film and a method for manufacturing the same are provided. The black polyester film includes a physically recycled polyester resin and a chemically recycled polyester resin. The physically recycled polyester resin is formed by a plurality of physically recycled polyester chips. The chemically recycled polyester resin is formed by a plurality of chemically recycled polyester chips and mixed with the physically recycled polyester resin. The plurality of chemically recycled polyester chips further include chemically recycled electrostatic pinning polyester chips. The chemically recycled electrostatic pinning polyester chips contain electrostatic pinning additives, and the electrostatic pinning additives are metal salts. Expressed in percent by weight based on a total weight of the polyester film, a content of the electrostatic pinning additives in the polyester film is between 0.005% and 0.1% by weight. The black polyester film further includes a black additive.

12 Claims, 1 Drawing Sheet

(51) Int. Cl.

| | |
|---|---|
| *B29C 48/08* | (2019.01) |
| *C08G 63/183* | (2006.01) |
| *C08J 3/12* | (2006.01) |
| *C08J 3/20* | (2006.01) |
| *C08J 11/06* | (2006.01) |
| *C08J 11/10* | (2006.01) |
| *C08K 3/04* | (2006.01) |
| *C08K 3/22* | (2006.01) |
| *C08K 3/26* | (2006.01) |
| *C08K 3/30* | (2006.01) |
| *C08K 3/36* | (2006.01) |
| *C08K 5/098* | (2006.01) |
| *C08L 25/06* | (2006.01) |
| *C08L 33/08* | (2006.01) |
| *C08L 67/02* | (2006.01) |
| *C08L 67/03* | (2006.01) |

(52) U.S. Cl.
CPC ............. *C08K 3/041* (2017.05); *C08K 3/042* (2017.05); *C08K 3/26* (2013.01); *C08K 3/30* (2013.01); *C08K 3/36* (2013.01); *C08K 5/098* (2013.01); *C08L 25/06* (2013.01); *C08L 33/08* (2013.01); *C08L 67/025* (2013.01); *B29C 48/00* (2019.02); *B29C 48/08* (2019.02); *C08G 2230/00* (2013.01); *C08J 3/20* (2013.01); *C08J 3/201* (2013.01); *C08J 11/06* (2013.01); *C08J 11/10* (2013.01); *C08K 3/04* (2013.01); *C08K 3/22* (2013.01); *C08K 2003/265* (2013.01); *C08K 2003/3045* (2013.01); *C08K 2201/005* (2013.01); *C08L 67/02* (2013.01); *C08L 67/03* (2013.01); *C08L 2203/16* (2013.01); *C08L 2203/30* (2013.01); *C08L 2205/02* (2013.01)

(56) References Cited

U.S. PATENT DOCUMENTS

| | | | |
|---|---|---|---|
| 2006/0246306 A1* | 11/2006 | Kliesch | B32B 27/36 428/480 |
| 2008/0017835 A1* | 1/2008 | Takahashi | C09C 1/3661 252/519.12 |
| 2009/0246430 A1* | 10/2009 | Kriegel | C08G 63/183 528/307 |
| 2012/0196968 A1* | 8/2012 | Kliesch | H01L 31/049 174/138 R |
| 2012/0251095 A1* | 10/2012 | Ono | G02B 5/003 359/227 |
| 2014/0288209 A1 | 9/2014 | Jung et al. | |
| 2016/0108278 A1* | 4/2016 | Vanier | C09C 1/44 524/496 |
| 2021/0047493 A1* | 2/2021 | Liao | B29B 17/0036 |
| 2021/0332199 A1* | 10/2021 | Liao | B32B 27/18 |
| 2021/0332214 A1* | 10/2021 | Liao | C08K 5/098 |
| 2022/0017707 A1* | 1/2022 | Yang | C08G 63/692 |
| 2022/0017708 A1* | 1/2022 | Yang | B32B 27/308 |
| 2022/0017709 A1* | 1/2022 | Yang | C08J 11/24 |
| 2022/0017769 A1* | 1/2022 | Yang | C08J 11/06 |
| 2022/0017770 A1* | 1/2022 | Yang | B32B 7/027 |
| 2022/0041835 A1* | 2/2022 | Liao | C08J 5/18 |
| 2022/0193971 A1* | 6/2022 | Yang | B29D 7/01 |
| 2022/0243029 A1* | 8/2022 | Yang | B29B 17/0036 |
| 2022/0363890 A1* | 11/2022 | Liao | C08L 67/02 |

FOREIGN PATENT DOCUMENTS

| | | | |
|---|---|---|---|
| JP | 2007-169424 A | * | 7/2007 |
| JP | 2007169424 A | | 7/2007 |
| JP | 2011-256328 A | * | 12/2011 |
| JP | 2011256328 A | | 12/2011 |
| JP | 5298414 B2 | | 9/2013 |
| JP | 201480593 A | | 5/2014 |
| JP | 2015134884 A | | 7/2015 |
| WO | 2017142287 A1 | | 8/2017 |

* cited by examiner

```
┌─────────────────────────────────────────┐
│   physically reproducing a part of the recycled
│ polyester material and granulating the same to obtain
│   a plurality of physically recycled polyester chips; and
│   chemically reproducing another part of the recycled
│   polyester material and granulating the same to obtain
│     a plurality of chemically recycled polyester chips;
│  wherein the plurality of chemically recycled polyester
│  chips further include chemically recycled electrostatic
│        pinning polyester chips; wherein the chemically
│   recycled electrostatic pinning polyester chips contain   ├── S110
│       at least one kind of electrostatic pinning additives,
│   and the electrostatic pinning additives are metal salts;
│   wherein the method for manufacturing the polyester
│    film further includes: in the physical reproducing step,
│        adding a black additive to the recycled polyester
│                              material
└─────────────────────────────────────────┘
                        │
                        ▼
┌─────────────────────────────────────────┐
│    mixing and melt extruding the plurality of physically
│           recycled polyester chips and the plurality of
│       chemically recycled polyester chips to form the
│    polyester film; wherein, based on 100 parts by weight
│     of a total content of the polyester chips, a content of   ├── S120
│      the chemically recycled electrostatic pinning polyester
│     chips of the plurality of chemically recycled polyester
│             chips is between 5 and 35 parts by weight
└─────────────────────────────────────────┘
```

BLACK POLYESTER FILM AND METHOD FOR MANUFACTURING THE SAME

CROSS-REFERENCE TO RELATED PATENT APPLICATION

This application claims the benefit of priority to Taiwan Patent Application No. 109114092, filed on Apr. 28, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a black polyester film and a method for manufacturing the same, and more particularly to a black polyester film that uses both a physically recycled polyester resin and a chemically recycled polyester resin, and a method for manufacturing the same.

BACKGROUND OF THE DISCLOSURE

In recent years, usage of plastics has increased significantly, and as a result, a large amount of plastic waste is produced. Since the plastics are not easily degraded, recycling of the plastics and how to process the plastics after recycling have become particularly important issues.

Polyethylene terephthalate (PET) makes up a major portion of recycled plastics, and recycled PET plastics takes up about 52.4% of a total amount of the recycled plastics. As such, the following description will be based on the recycled PET plastics. In order to deal with such a large amount of recycled PET plastics, researchers in relevant field have to dedicate themselves to developing a method for processing the recycled PET plastics.

Out of the current techniques, the most common method for PET recycling is to recycle PET in a physical (mechanical) manner. The recycled PET plastics that have been washed clean are firstly shredded to pieces and melted under high temperature, and then are extruded by an extruder to produce recycled PET chips (also called as r-PET).

To address environmental concerns and to ensure that PET products contain more eco-friendly recycled PET chips, a large amount of high-quality recycled PET chips is required. In the current industry, the PET recycling is mostly carried out by way of physical recycling. However, functional components (such as a slipping agent, an electrostatic pinning agent, etc.) are not allowed to be added, during a manufacturing process, to recycled chips that are produced through physical recycling. Therefore, it is necessary to use additional new and not recycled PET chips for additionally adding the above-mentioned functional components.

In this way, however, a usage rate of the recycled PET chips contained in the PET products will decrease. That is to say, in the current techniques, it is not possible to fully utilize the recycled PET chips to manufacture new PET products. If the usage rate of the recycled PET chips is too low, it may not be possible to satisfy a standard set up by environmental regulations such that an eco-label can be obtained. Moreover, as virgin PET chips that are newly used in the process of manufacturing the PET products would subsequently become the recycled PET plastics that require processing, a problem of recycling and reusing would still arise.

SUMMARY OF THE DISCLOSURE

In response to the above-referenced technical inadequacies, the present disclosure provides a black polyester film and a method for manufacturing the same.

In one aspect, the present disclosure provides a method for manufacturing a black polyester film, which is used to recycle and reuse a recycled polyester material. The method for manufacturing the black polyester film includes: physically reproducing a part of the recycled polyester material and granulating the same to obtain a plurality of physically recycled polyester chips; chemically reproducing another part of the recycled polyester material and granulating the same to obtain a plurality of chemically recycled polyester chips; and mixing the plurality of physically recycled polyester chips and the plurality of chemically recycled polyester chips, and melt extruding the same to form a polyester film. The plurality of chemically recycled polyester chips further include chemically recycled electrostatic pinning polyester chips. The chemically recycled electrostatic pinning polyester chips contain at least one kind of electrostatic pinning additives, and the electrostatic pinning additives are metal salts. Based on 100 parts by weight of a total content of the polyester chips, a content of the chemically recycled electrostatic pinning polyester chips of the plurality of chemically recycled polyester chips is between 5 and 35 parts by weight. The method for manufacturing the black polyester film further includes: in the physical reproducing step, adding a black additive to the recycled polyester material, so that the polyester film that is finally formed includes the black additive.

Preferably, the black additive is at least one selected from a material group consisting of carbon black powder, graphite powder, nano carbon black, carbon nanotube, and graphene. A particle size of the black additive is between 0.01 and 10 micrometers, and a content of the black additive in the polyester film is between 1% and 40% by weight, so that the polyester film as a whole is of black color, and the polyester film has an optical density of not less than 1.5.

Preferably, in the polyester film, the plurality of physically recycled polyester chips form a physically recycled polyester resin, and the plurality of chemically recycled polyester chips form a chemically recycled polyester resin that is mixed with the physically recycled polyester resin. Based on 100 parts by weight of the total content of the polyester chips, a content of the plurality of physically recycled polyester chips is between 50 and 95 parts by weight, a content of the plurality of chemically recycled polyester chips is between 1 and 40 parts by weight, and a total content of the plurality of physically recycled polyester chips and the plurality of chemically recycled polyester chips is between 55 and 100 parts by weight.

Preferably, the step of chemically reproducing another part of the recycled polyester material further includes: depolymerizing the recycled polyester material to obtain a raw material mixture, and repolymerizing the raw material mixture and granulating the same, thereby obtaining the plurality of chemically recycled polyester chips.

Preferably, the step of repolymerizing the raw material mixture further includes: adding the electrostatic pinning additives to a part of the raw material mixture, and then repolymerizing the raw material mixture that is added with the electrostatic pinning additives and granulating the same, thereby obtaining the chemically recycled electrostatic pinning polyester chips.

Preferably, a content of the electrostatic pinning additives in the chemically recycled electrostatic pinning polyester chips is between 0.01% and 0.3% by weight, so that a content of the electrostatic pinning additives in the polyester film is between 0.005% and 0.1% by weight.

Preferably, the step of repolymerizing the raw material mixture further includes: adding a slipping agent to a part of the raw material mixture, and then repolymerizing the raw material mixture that is added with the slipping agent and granulating the same to obtain chemically recycled slipping polyester chips. The slipping agent is at least one selected from a material group consisting of silicon dioxide particles, calcium carbonate particles, barium sulfate particles, polystyrene particles, silica gel particles, and acrylic particles. Based on 100 parts by weight of the total content of the polyester chips, a content of the chemically recycled slipping polyester chips is between 5 and 10 parts by weight.

Preferably, a particle size of the slipping agent is less than 2 micrometers. A content of the slipping agent in the chemically recycled slipping polyester chips is between 0.1% and 20% by weight, so that a content of the slipping agent in the polyester film is between 0.01% and 2% by weight.

Preferably, the step of physically reproducing a part of the recycled polyester material further includes: physico-mechanically shredding and melting the recycled polyester material, and then adding the black additive to the melted recycled polyester material and granulating the same to obtain physically recycled black polyester chips.

Preferably, the black additive is only included in the physically recycled polyester resin, and not included in the chemically recycled polyester resin.

Preferably, the plurality of physically recycled polyester chips and the plurality of chemically recycled polyester chips are both obtained through recycling, reusing, and granulation of the recycled polyester material. The recycled polyester material is recycled PET (r-PET) bottle chips.

Preferably, a polyester component of the recycled PET bottle chips includes isophthalic acid (IPA) serving as a dibasic acid unit, so that the polyester film that is finally formed also contains the isophthalic acid. Expressed in mole percent based on a total weight of the polyester film, a content of the isophthalic acid in the polyester film is between 0.5 mol % and 5 mol %.

Preferably, a polyester component of the recycled PET bottle chips includes biomass-derived ethylene glycol serving as a diol unit, so that the polyester film that is finally formed also contains the biomass-derived ethylene glycol. Expressed in percent by weight based on the total weight of the polyester film, a content of the biomass-derived ethylene glycol in the polyester film is between 1% and 25% by weight. A content of carbon derived from the biomass as measured by carbon dating (C14) is not greater than 5% based on a total carbon content of the polyester film.

In another aspect, the present disclosure provides a black polyester film. The black polyester film includes a physically recycled polyester resin formed by a plurality of physically recycled polyester chips, and a chemically recycled polyester resin formed by a plurality of chemically recycled polyester chips and mixed with the physically recycled polyester resin. The plurality of chemically recycled polyester chips further include chemically recycled electrostatic pinning polyester chips. The chemically recycled electrostatic pinning polyester chips contain at least one kind of electrostatic pinning additives, and the electrostatic pinning additives are metal salts. Expressed in percent by weight based on a total weight of the polyester film, a content of the electrostatic pinning additives in the polyester film is between 0.005% and 0.1% by weight. The polyester film further includes a black additive, and the black additive is dispersed in the physically recycled polyester resin.

Preferably, the black additive is at least one selected from a material group consisting of carbon black powder, graphite powder, nano carbon black, carbon nanotube, and graphene. A particle size of the black additive is between 0.01 and 10 micrometers, and a content of the black additive in the polyester film is between 1% and 40% by weight, so that the polyester film as a whole is of black color, and the polyester film has an optical density of not less than 1.5.

Preferably, expressed in percent by weight based on the total weight of the polyester film, a content of the physically recycled polyester resin is between 50% and 95% by weight, a content of the chemically recycled polyester resin is between 1% and 40% by weight, and a total content of the physically recycled polyester resin and the chemically recycled polyester resin is between 55% and 100% by weight.

Preferably, the plurality of chemically recycled polyester chips further include chemically recycled slipping polyester chips. The chemically recycled slipping polyester chips contain a slipping agent, and the slipping agent is at least one selected from a material group consisting of silicon dioxide particles, calcium carbonate particles, barium sulfate particles, polystyrene particles, silica gel particles, and acrylic particles. Based on 100 parts by weight of a total content of the polyester chips, a content of the chemically recycled slipping polyester chips is between 5 and 10 parts by weight relative to the total content of the polyester chips.

Preferably, a particle size of the slipping agent is less than 2 micrometers. Expressed in percent by weight based on the total weight of the polyester film, a content of the slipping agent in the polyester film is between 0.01% and 2% by weight.

One beneficial effect of the present disclosure is that, in the black polyester film and the method for manufacturing the same as provided, by virtue of "the plurality of chemically recycled polyester chips further including chemically recycled electrostatic pinning polyester chips, the chemically recycled electrostatic pinning polyester chips containing the electrostatic pinning additives, and the electrostatic pinning additives being metal salts" and "based on 100 parts by weight of the total content of the polyester chips, the content of the chemically recycled electrostatic pinning polyester chips of the plurality of chemically recycled polyester chips being between 5 and 35 parts by weight", the black polyester film can be manufactured by using a highly recycled polyester material, without needing to add additional virgin polyester chips or only needing to add a small amount thereof. In this way, a usage amount of the virgin polyester chips can be decreased significantly, and environmental concerns can be addressed.

Furthermore, in the black polyester film and the method for manufacturing the same as provided by the present disclosure, through "adding the black additive to the recycled polyester material in the physical reproducing step", the black polyester film has a certain black effect, and can be applied to specific products (e.g., printing films, packaging films, barrier films, curtains, light-shading films, adhesive tapes, and labels).

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 1 is a flowchart describing a method for manufacturing a polyester film according to one embodiment of the present disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In order to process large amounts of recycled plastics, especially with respect to a recycled polyester material, an embodiment of the present disclosure provides a black polyester film that is produced by using the recycled polyester material, and a method for manufacturing the same. Referring to FIG. 1, a flowchart briefly describing the method for manufacturing the black polyester film (e.g., step S110 to step S120) is shown. A more detailed description will be provided below.

In the polyester film of the present embodiment and the method for manufacturing the same, a physically recycled polyester resin is obtained through physical reproduction, and a chemically recycled polyester resin is obtained through chemical reproduction. In this way, a usage amount of the recycled polyester material in the polyester film would increase.

To be more specific, the polyester film of the present embodiment can be produced by using a highly recycled polyester material, without needing to add additional virgin polyester chips or only needing to add a small amount thereof.

Recycled Polyester Material

Firstly, to obtain the recycled polyester material that is reusable, a recycling method for polyester resins includes: collecting discarded polyester resin materials of all types. The discarded polyester resin materials are then sorted by type, color, and intended purpose. Further, these discarded polyester resin materials are pressed and baled to be shipped to waste treatment facilities. In the present embodiment, the discarded polyester resin materials are recycled PET bottles. However, the present disclosure is not limited thereto.

Next, other parts (e.g., bottle tops, labels, and adhesives) of the discarded polyester resin materials would be removed. When such parts are removed from the discarded polyester resin materials, the discarded polyester resin materials are shredded, and then bottle rims, gaskets, and bottle bodies of different materials are separated from each other by flotation. The discarded polyester resin materials that are shredded are then dried. In this way, the recycled polyester material which has been processed, e.g., recycled PET (r-PET) bottle chips, can be obtained, and a subsequent process for manufacturing the polyester film may proceed.

It is worth mentioning that, in other embodiments of the present disclosure, the recycled polyester material can be, for example, a processed recycled polyester material directly obtained through purchase, so as to proceed with the subsequent process for manufacturing the polyester film.

In the embodiment of the present disclosure, the method for manufacturing the polyester film includes: physically reproducing a part of the recycled polyester material (e.g., PET bottle chips) and granulating the same to obtain a plurality of physically recycled polyester chips, and chemically reproducing another part of the recycled polyester material and granulating the same to obtain a plurality of chemically recycled polyester chips.

It should be noted that, the terms "polyester", "polyester material", "polyester resin", etc., refer to any type of polyester, and especially to polyarylate. In particular, polyester derived from terephthalic acid and ethylene glycol, i.e., polyethylene terephthalate (PET), is referred to herein.

The polyester can also be, for example, poly trimethylene terephthalate, polybutylene terephthalate, or polyethylene naphthalate. The polyester in the present embodiment is preferably polyethylene terephthalate and poly trimethylene terephthalate. Moreover, a copolymer can also be used. The copolymer herein particularly refers to a copolymer derived from more than two types of dicarboxylic acid and/or more than two types of diol component.

Physical Reproduction

A physical reproduction method includes: shredding the polyester material that is recycled (e.g., PET bottle chips), so as to decrease the time and energy consumption required for melting the recycled polyester material, the recycled polyester material that has been shredded is melted and shredded, and then granulated via a single-screw extruder or a twin-screw extruder, so as to obtain the plurality of physically recycled polyester chips. That is to say, after undergoing the steps of shredding, melting and extruding in a sequential order, the recycled polyester material is reshaped, so that polyester molecules in the recycled polyester material are rearranged to thereby produce the plurality of physically recycled polyester chips.

Specifically, in the present embodiment, the plurality of physically recycled polyester chips can be further separated into physically recycled regular polyester chips and physically recycled slipping polyester chips.

The physically recycled regular polyester chips are physically recycled polyester chips that are not added with other additional additives (e.g., an electrostatic pinning additive, a slipping agent, and a coloring material) in the physical reproduction process.

Further, the physically recycled slipping polyester chips are physically recycled polyester chips that are further added with a slipping agent in the physical reproduction process (especially in the polyester melting process).

That is to say, the physically recycled slipping polyester chips contain a slipping agent, and the slipping agent is at least one selected from a material group consisting of silicon dioxide particles, calcium carbonate particles, barium sulfate particles, polystyrene particles, silica gel particles, and acrylic particles.

It should be noted that, in the present embodiment, the slipping agent can not only be added to the physically recycled polyester chips, but also be selectively added to chemically recycled polyester chips.

It is also worth mentioning that the polyester molecules have only been rearranged in the physical reproduction process, without being regrouped. Therefore, components originally present in the recycled polyester material (e.g., a metal catalyst, a slipping agent, an antioxidant, or an additive used in polyester synthesis) would still remain in a physically recycled polyester material, so that the polyester film that is finally formed would also contain such components. Meanwhile, properties that are inherent in polyester resins of PET bottles, such as having a lower concentration of cyclic oligomer, would also be kept in the physically recycled polyester chips.

Chemical Reproduction

A chemical reproduction method includes: shredding the polyester material that is recycled (e.g., PET bottle chips), so as to decrease the time and energy consumption required for depolymerizing the recycled polyester material. Then, by immersion of the recycled polyester material that has been shredded in a chemical depolymerization solution, the polyester molecules of the recycled polyester material are subject to scission, thereby achieving depolymerization of the recycled polyester material. Further, a polyester composite with a shorter molecular chain and an ester monomer (e.g., BHET) formed by a combination of one dibasic acid unit and two diol units can be obtained.

In the present embodiment, the chemical depolymerization solution can be a solution of, for example, water, methyl alcohol, ethanol, ethylene glycol, diethylene glycol, or a combination thereof. However, the present disclosure is not limited thereto. For example, water is used for hydrolysis, and methyl alcohol, ethanol, ethylene glycol, or diethylene glycol is used for alcoholysis.

A raw material mixture is then filtered, so as to decrease concentration of non-polyester impurities in the raw material mixture. In addition, under specific reaction conditions, monomers and/or oligomers in the raw material mixture are repolymerized and granulated, so that the plurality of chemically recycled polyester chips can be obtained.

That is to say, different from physical reproduction, the chemical reproduction process involves "depolymerizing and repolymerizing the polyester molecules of the recycled polyester material", which allows the polyester molecules to be depolymerized into molecules of smaller molecular weight, and be repolymerized to form a new polyester resin.

In other embodiments of the present disclosure, a preparation method for the chemically recycled polyester chips is not limited by the description of the above-mentioned embodiment. The chemically recycled polyester chips can also be produced by a hydrolysis method or a supercritical fluid method. In the hydrolysis method, the recycled polyester material is processed in an alkaline solution. When being subject to a certain temperature, a certain pressure, and irradiation of microwave radiation, the polyester molecules are completely split into monomers. In the supercritical fluid method, the recycled polyester material is broken down into a small amount of monomers and oligomers in the methyl alcohol that is in a supercritical fluid state. A yield of the monomers and the oligomers would be affected by a reaction temperature and a reaction time.

More specifically, in the present embodiment, the plurality of chemically recycled polyester chips can be further separated into chemical regular polyester chips, chemical slipping polyester chips, and chemical electrostatic pinning polyester chips.

The chemical regular polyester chips are chemically recycled polyester chips that are not added with other additional additives (e.g., an electrostatic pinning additive, a slipping agent, and a coloring material) in the chemical reproduction process.

Moreover, a preparation method for the above-mentioned chemical slipping polyester chips and the chemical electrostatic pinning polyester chips can be, for example, adding other additives (e.g., a slipping agent, an electrostatic pinning additive, and the like) to the raw material mixture with monomers (e.g., an ester monomer (BHET) formed by a reaction between two diol units and one dibasic acid unit) and/or oligomers in the repolymerization process of the polyester molecules. In this way, the additives would be uniformly mixed in the raw material mixture, to thereby alter properties of the chemically recycled polyester resin (e.g., slipperiness and electrostatic pinning property).

In the present embodiment, the step of repolymerizing the raw material mixture further includes: adding a slipping agent to a part of the raw material mixture to be uniformly mixed, and then repolymerizing the raw material mixture that is added with the slipping agent and granulating the same to obtain chemically recycled slipping polyester chips. The slipping agent is at least one selected from a material group consisting of silicon dioxide particles, calcium carbonate particles, barium sulfate particles, polystyrene particles, silica gel particles, and acrylic particles.

In addition, as mentioned above, the slipping agent can be selectively added in the physically recycled polyester chips and/or the chemically recycled polyester chips.

In the present embodiment, the step of repolymerizing the raw material mixture further includes: adding electrostatic pinning additives to a part of the raw material mixture, and then repolymerizing the raw material mixture that is added with the electrostatic pinning additives and granulating the same to obtain chemically recycled electrostatic pinning polyester chips.

It should be noted that, in the present description, the term "electrostatic pinning" refers to a use of a material that increases electrical conductivity or decreases electrical resistance, and the term "electrostatic pinning additive"

refers to the material that increases electrical conductivity or decreases electrical resistance.

According to the embodiment of the present disclosure, a preferred compound that is provided with an electrostatic pinning effect will be illustrated in the following description. However, the present disclosure is not limited thereto. Other known materials in the current technology, i.e., compounds or components that increase electrical conductivity of polyester or decrease electrical resistance thereof, can also be selected for use.

More specifically, the electrostatic pinning additives used in the present embodiment are metal salts. Preferably, the metal salts are metal salts that contain alkali metals or alkaline-earth metals, and contain aliphatic carboxylic acid.

In the metal salts that contain aliphatic carboxylic acid, a molecular structure of the aliphatic carboxylic acid contains 2 to 30 carbon atoms. For example, the aliphatic carboxylic acid (in the form of metal salts) contains monocarboxylic acid and dicarboxylic acid, and can be, for example, acetic acid, palmitic acid, stearic acid, oleic acid, or sebacic acid. In the present embodiment, the aliphatic carboxylic acid is preferably the acetic acid.

Furthermore, metal components of the metal salts can be, for example, alkali metals or alkaline-earth metals. In other words, the metal salts can be, for example, lithium salts, sodium salts, potassium salts, calcium salts, or magnesium salts.

In the present embodiment, the metal salts are preferably the magnesium salts or the lithium salts. The magnesium salts can be, for example, magnesium acetate (Mg$(CH_3COO)_2$), and the lithium salts can be, for example, lithium acetate ($CH_3COOLi$). However, the present disclosure is not limited thereto.

It is worth mentioning that, in current methods for manufacturing polyester films, a method that involves electrostatic pinning of a polyester melt is often employed to improve a production speed of the polyester film. In such a method, the polyester melt is required to have as low an electrical resistance value as possible to thereby achieve a high product quality. This can often be realized through adding the electrostatic pinning additives to the polyester melt.

In the current technology, however, the electrostatic pinning additives are often added in the virgin polyester chips. Therefore, although the recycled polyester material is used for manufacturing the polyester film, a large amount of the virgin polyester chips is still required to complete the manufacturing of the polyester film. As such, a usage rate of the recycled polyester material cannot be effectively enhanced.

Compared with the current technology, the method for manufacturing the polyester film of the present embodiment is to, in the repolymerization process of the polyester molecules, add the electrostatic pinning additives to the raw material mixture with monomers (e.g., BHET) and/or oligomers. In this way, the electrostatic pinning additives and the monomers and/or the oligomers are mixed uniformly. Then, the monomers and/or the oligomers in the raw material mixture would be repolymerized, so that the electrostatic pinning additives can be more uniformly mixed in the polyester resins.

Accordingly, by providing the chemically recycled electrostatic pinning polyester chips of the present embodiment, the adding of the electrostatic pinning additives to the virgin polyester materbatches can be replaced, so as to effectively decrease a usage amount of the virgin polyester chips and significantly increase the usage rate of the recycled polyester material.

It should be noted that, in order for the electrostatic pinning additives of the present embodiment to be uniformly mixed in polyester components, the chemical reproduction method must be employed.

In contrast, in the physical reproduction method, since the polyester molecules cannot be significantly degraded into monomers and/or oligomers, the electrostatic pinning additives cannot be uniformly mixed in the polyester resins. Thus, an intended effect of the electrostatic pinning additives (e.g., electrostatic pinning property) is prevented from being exerted.

That is to say, through adding the chemically recycled electrostatic pinning polyester chips of the present embodiment, electrical conductivity of the polyester resins can be effectively enhanced, thereby achieving a high production rate of a polyester film.

In a preparation process for the polyester film, when the chemically recycled electrostatic pinning polyester chips of the present embodiment are used, the speed of a first roller (injection molding roller/cooling roller) of a polyester film production equipment is significantly increased (for example, reaching a maximum value of 120 m/min), while the polyester film can still be produced smoothly. At this speed, the polyester film can still remain closely adhered to a roller surface. In addition, at such a high speed, a thinner thin film can be produced. For example, a thin film that has a minimum thickness of 9 micrometers can be produced. In particular, the chemically recycled electrostatic pinning polyester chips of the present embodiment can effectively regulate the required electrical conductivity or electrical resistance value.

Accordingly, a number of chemically recycled polyester chips with different properties can be produced by virtue of the above-mentioned additives. Further, by virtue of the above-mentioned two different processes of physical reproduction and chemical reproduction, physically recycled polyester chips and chemically recycled polyester chips of different properties can be obtained. In this way, when a specific type of the chemically recycled polyester chips is selected, and a usage ratio is configured between the physically recycled polyester chips and the chemically recycled polyester chips, it can be advantageous for subsequent manufacturing of different polyester products (for example, a polyester film).

It is worth mentioning that, with respect to the method for manufacturing the polyester film of the present embodiment, cyclic oligomers may be generated in both the physical reproduction and chemical reproduction processes. Here, a concentration of the cyclic oligomers generated in the physical reproduction process is far less than a concentration of the cyclic oligomers generated in the chemical reproduction process.

It is also worth mentioning that, in one embodiment of the present disclosure, the step of chemically reproducing another part of the recycled polyester material further includes: using an ethylene glycol depolymerization solution to depolymerize the recycled polyester material, thereby obtaining the raw material mixture. Then, the plurality of physically recycled polyester chips are mixed with the plurality of chemically recycled polyester chips to decrease a concentration of diethylene glycol in the polyester film product. To be more specific, since a large amount of the ethylene glycol depolymerization solution is added to depolymerize the recycled polyester material, a composition ratio of diethylene glycol of the chemically recycled polyester resin as produced in a subsequent polymerization process would be relatively high. In addition, the diethylene glycol contains an ether group, which would decrease a heat resistance of the polyester material. Therefore, through mixing the plurality of physically recycled polyester chips with the plurality of chemically recycled polyester chips, an overall concentration of diethylene glycol in the polyester film is decreased in the present disclosure, thereby improving the above-mentioned problem of decreased heat resistance.

Preparation of Polyester Film

After the physical reproducing and chemical reproducing steps, the method for manufacturing the polyester film of the present embodiment further includes: mixing the plurality of physically recycled polyester chips and the plurality of chemically recycled polyester chips with each other, and melt extruding the same to form a polyester film.

In the polyester film, the plurality of physically recycled polyester chips form a physically recycled polyester resin, and the plurality of chemically recycled polyester chips form a chemically recycled polyester resin. The physically recycled polyester resin and the chemically recycled polyester resin are uniformly mixed with each other.

To enhance the usage rate of the recycled polyester material, each type of the recycled polyester chips as mentioned above has an appropriate content range.

More specifically, based on 100 parts by weight of a total content of the polyester chips, a content of the plurality of physically recycled polyester chips is preferably between 50 and 95 parts by weight, and is most preferably between 60 and 80 parts by weight. A content of the plurality of chemically recycled polyester chips is preferably between 1 and 40 parts by weight, and is most preferably between 20 and 30 parts by weight. Furthermore, a total content of the plurality of physically recycled polyester chips and the plurality of chemically recycled polyester chips is preferably between 55 and 100 parts by weight, and is most preferably between 70 and 100 parts by weight.

That is to say, expressed in percent by weight based on a total weight of the polyester film, a content of the physically recycled polyester resin is preferably between 50% and 95% by weight, and is most preferably between 60% and 80% by weight. A content of the chemically recycled polyester resin is preferably between 1% and 40% by weight, and is most preferably between 20% and 30% by weight. Furthermore, a total content of the physically recycled polyester resin and the chemically recycled polyester resin is preferably between 55% and 100% by weight, and is most preferably between 70% and 100% by weight.

It should be noted that, the term "percent by weight" may be abbreviated as "wt %" in the present description.

Based on the above configuration, a highly recycled polyester material can be used in the method for manufacturing the polyester film of the present embodiment, without needing to add additional virgin polyester chips or only needing to add a small amount thereof. For example, in one embodiment of the present disclosure, a content of the virgin polyester chips is generally not greater than 50 parts by weight, is preferably not greater than 30 parts by weight, and is most preferably not greater than 10 parts by weight.

To be specific, with respect to the slipping agent, based on 100 parts by weight of the total content of the polyester chips, a content of the physically recycled slipping polyester chips and/or the chemically recycled slipping polyester chips is between 5 and 10 parts by weight relative to the total content of the polyester chips.

Further, a particle size of the slipping agent is less than 2 micrometers. Of the physically recycled slipping polyester chips and/or the chemically recycled slipping polyester chips, a content of the slipping agent in the above-mentioned recycled slipping polyester chips is between 0.1% and 20% by weight, so that a content of the slipping agent in the polyester film is between 0.01% and 2% by weight.

In addition, with respect to the electrostatic pinning additives, based on 100 parts by weight of the total content of the polyester chips, a content of the chemically recycled electrostatic pinning polyester chips of the plurality of chemically recycled polyester chips is between 5 and 35 parts by weight.

A content of the electrostatic pinning additives in the chemically recycled electrostatic pinning polyester chips is between 0.01% and 0.3% by weight, so that a content of the electrostatic pinning additives in the polyester film is between 0.005% and 0.1% by weight.

It is worth mentioning that, in order for the polyester film to exhibit a black effect, the method for manufacturing the black polyester film in the present embodiment further includes: in the physical reproducing step, adding a black additive to the recycled polyester material, so that the polyester film that is finally formed includes the black additive.

In other words, the black additive can be added by way of physical reproduction. More specifically, the step of physically reproducing a part of the recycled polyester material further includes: mechanically shredding and melting the recycled polyester material, and then adding the black additive to the melted recycled polyester material and granulating the same via the single-screw extruder or the twin-screw extruder, to thereby obtain physically recycled black polyester chips.

Accordingly, the polyester film that is finally formed further includes the black additive, and the black additive is evenly dispersed in the physically recycled polyester resin.

The black additive can be, for example, a black inorganic compound, and the black inorganic compound can be for example, at least one selected from a material group consisting of carbon black powder, graphite powder, nano carbon black, carbon nanotube, and graphene.

Furthermore, a particle size of the black additive is between 0.01 and 10 micrometers, and a content of the black additive in the polyester film is between 1% and 40% by weight, so that the polyester film as a whole is of black color.

Moreover, the polyester film can be further dispersed with silicon dioxide, titanium dioxide, barium sulfate, and calcium carbonate, which can assist in increasing light-shielding properties.

Accordingly, the entire polyester film has an optical density (OD) of not less than 1.5, and a visible light transmission (VLT) of not more than 75%.

It is worth mentioning that, the particle size of the black additive mentioned above is generally between 0.01 and 10 micrometers, is preferably between 0.01 and 5 micrometers, and is most preferably between 0.01 and 2 micrometers.

A content of the above-mentioned black additive in the polyester film is generally between 1% and 40% by weight, is preferably between 1% and 20% by weight, and is most preferably between 1% and 10% by weight.

The optical density of the above-mentioned polyester film is preferably not less than 1.5.

The visible light transmission of the above-mentioned polyester film is preferably not greater than 75%.

It is also worth mentioning that, in the chemical reproducing step, machines or equipment used in the manufacturing process may be stained by the black additive, which causes the machines or equipment to be difficult to be cleaned. Therefore, the black additive is not suitable for being added in the chemical reproduction step.

That is to say, in the present embodiment, the black additive is only included in the physically recycled polyester resin, and not included in the chemically recycled polyester resin, but the present disclosure is not limited thereto.

According to the above-mentioned configuration, the black polyester film of the present embodiment has a certain black effect, and can be applied to specific products (e.g., printing films, packaging films, barrier films, curtains, light-shading films, adhesive tapes, and labels).

It is also worth mentioning that, the plurality of physically recycled polyester chips and the plurality of chemically recycled polyester chips as mentioned above are both obtained through recycling, reusing, and granulation of the recycled polyester material. The recycled polyester material is recycled PET (r-PET) bottle chips.

In one embodiment of the present disclosure, a polyester component of the recycled PET bottle chips includes isophthalic acid (IPA) serving as a dibasic acid unit, so that the polyester film that is finally formed also contains the isophthalic acid. Expressed in mole percent based on the total weight of the polyester film, a content of the isophthalic acid in the polyester film is between 0.5 mol % and 5 mol %.

In one embodiment of the present disclosure, a polyester component of the recycled PET bottle chips includes biomass-derived ethylene glycol serving as a diol unit, so that the polyester film that is finally formed also contains the biomass-derived ethylene glycol. Expressed in percent by weight based on the total weight of the polyester film, a content of the biomass-derived ethylene glycol in the polyester film is between 1% and 25% by weight. In addition, a content of carbon derived from the biomass as measured by carbon dating (C14) is not greater than 5% based on a total carbon content of the polyester film.

In one embodiment of the present disclosure, a polyester component of the recycled PET bottle chips includes a metal catalyst, so that the polyester film that is finally formed also contains the metal catalyst. The metal catalyst is at least one selected from a material group consisting of antimony (Sb), germanium (Ge), and titanium (Ti). Expressed in percent by weight based on the total weight of the polyester film, a content of the metal catalyst in the polyester film is between 0.0003% and 0.04% by weight.

BENEFICIAL EFFECTS OF THE EMBODIMENTS

One beneficial effect of the present disclosure is that, in the black polyester film and the method for manufacturing the same as provided, by virtue of "the plurality of chemically recycled polyester chips further including chemically recycled electrostatic pinning polyester chips, the chemically recycled electrostatic pinning polyester chips containing at least one kind of electrostatic pinning additives, and the electrostatic pinning additives being metal salts" and "based on 100 parts by weight of the total content of the polyester chips, the content of the chemically recycled electrostatic pinning polyester chips of the plurality of chemically recycled polyester chips being between 5 and 35 parts by weight", the black polyester film can be manufactured by using a highly recycled polyester material, without needing to add additional virgin polyester chips or only needing to add a small amount thereof. In this way, a usage amount of the virgin polyester chips can be decreased significantly, and environmental concerns can be addressed.

Furthermore, in the black polyester film and the method for manufacturing the same as provided by the present disclosure, through "adding the black additive to the recycled polyester material in the physical reproducing step", the black polyester film has a certain black effect, and can be applied to specific products (e.g., printing films, packaging films, barrier films, curtains, light-shading films, adhesive tapes, and labels).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for manufacturing a black polyester film, comprising:
    providing a recycled polyester material, wherein the recycled polyester material is recycled PET (r-PET) bottle chip;
    physically processing a part of the recycled polyester material and granulating the same to obtain a plurality of physically recycled polyester chips;
    chemically processing another part of the recycled polyester material and granulating the same to obtain a plurality of chemically recycled polyester chips, wherein the plurality of chemically recycled polyester chips further include chemically recycled electrostatic pinning polyester chips, and wherein the chemically recycled electrostatic pinning polyester chips contain at least one kind of electrostatic pinning additives, and the electrostatic pinning additives are metal salts; and
    mixing the plurality of physically recycled polyester chips and the plurality of chemically recycled polyester chips, and melt extruding the same to form a polyester film;
    wherein, based on a total content of the polyester film as a whole being 100 parts by weight, a content of the chemically recycled electrostatic pinning polyester chips is between 5 and 35 parts by weight;
    wherein the method further comprises: in the step of physically processing the part of the recycled polyester material, adding a black additive to the recycled polyester material, so that the polyester film that is finally formed includes the black additive.

2. The method according to claim 1, wherein the black additive is at least one selected from a material group consisting of carbon black powder, graphite powder, nano carbon black, carbon nanotube, and graphene; wherein a particle size of the black additive is between 0.01 and 10 micrometers, wherein, based on the total content of the polyester film as the whole being 100 parts by weight, a content of the black additive in the polyester film is between 1 and 40 parts by weight, so that the polyester film as a whole is of black color, and the polyester film has an optical density of not less than 1.5.

3. The method according to claim 1, wherein, in the polyester film, the plurality of physically recycled polyester chips form a physically recycled polyester resin, and the plurality of chemically recycled polyester chips form a chemically recycled polyester resin that is mixed with the physically recycled polyester resin; wherein, based on the total content of the polyester film as the whole being 100 parts by weight, a content of the plurality of physically recycled polyester chips is between 50 and 95 parts by weight, a content of the plurality of chemically recycled polyester chips is between 1 and 40 parts by weight, and a total content of the plurality of physically recycled polyester chips and the plurality of chemically recycled polyester chips is between 55 and 100 parts by weight.

4. The method according to claim 3, wherein the step of physically processing the part of the recycled polyester material is achieved by: physico-mechanically shredding and melting the recycled polyester material, and then adding the black additive to the melted recycled polyester material and granulating the same to obtain physically recycled black polyester chips.

5. The method according to claim 4, wherein the black additive is only included in the physically recycled polyester resin, and not included in the chemically recycled polyester resin.

6. The method according to claim 1, wherein the step of chemically processing another part of the recycled polyester is achieved by: depolymerizing the recycled polyester material to obtain a raw material mixture, and repolymerizing the raw material mixture and granulating the same, thereby obtaining the plurality of chemically recycled polyester chips.

7. The method according to claim 6, wherein the chemically recycled electrostatic pinning polyester chips is obtained by: adding the electrostatic pinning additives to a part of the raw material mixture, and then repolymerizing the raw material mixture that is added with the electrostatic pinning additives and granulating the same, thereby obtaining the chemically recycled electrostatic pinning polyester chips.

8. The method according to claim 7, wherein, based on the total content of the polyester film as the whole being 100 parts by weight, a content of the electrostatic pinning additives in the polyester film is between 0.005 and 0.1 parts by weight.

9. The method according to claim 6, wherein the step of repolymerizing the raw material mixture further includes: adding a slipping agent to a part of the raw material mixture, and then repolymerizing the raw material mixture that is added with the slipping agent and granulating the same to obtain chemically recycled slipping polyester chips; wherein the slipping agent is at least one selected from a material group consisting of silicon dioxide particles, calcium carbonate particles, barium sulfate particles, polystyrene particles, silica gel particles, and acrylic particles; wherein, based on the total content of the polyester film as the whole being 100 parts by weight, a content of the chemically recycled slipping polyester chips is between 5 and 10 parts by weight.

10. The method according to claim 9, wherein a particle size of the slipping agent is less than 2 micrometers; wherein, based on the total content of the polyester film as the whole being 100 parts by weight, a content of the slipping agent in the polyester film is between 0.01 and 2 parts by weight.

11. The method according to claim 1, wherein the plurality of physically recycled polyester chips and the plurality of chemically recycled polyester chips are both obtained through recycling, reusing, and granulation of the recycled polyester material.

12. The method according to claim 11, wherein a polyester component of the recycled PET bottle chips includes biomass-derived ethylene glycol serving as a diol unit, so that the polyester film that is finally formed also contains the biomass-derived ethylene glycol; wherein based on the total content of the polyester film as the whole being 100 parts by weight, a content of the biomass-derived ethylene glycol in the polyester film is between 1 and 25 parts by weight.

\* \* \* \* \*